No. 656,530. Patented Aug. 21, 1900.
H. E. DOWNING & H. L. DORSETT.
NUT LOCK.
(Application filed May 17, 1900.)
(No Model.)
Fig. 1
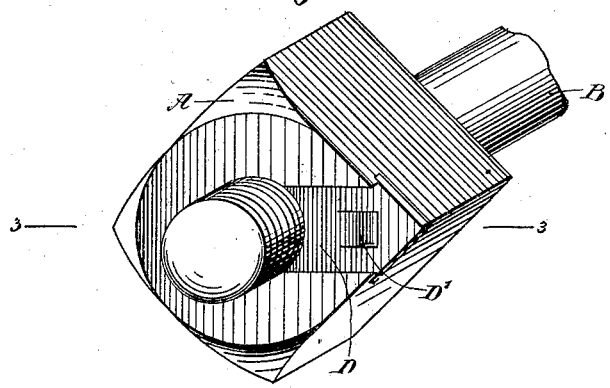
Fig. 5
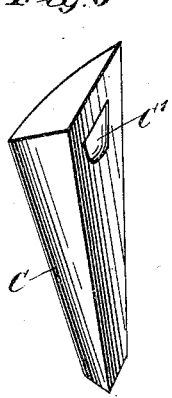
Fig. 2
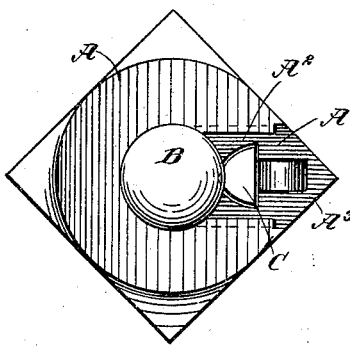
Fig. 6
Fig. 3
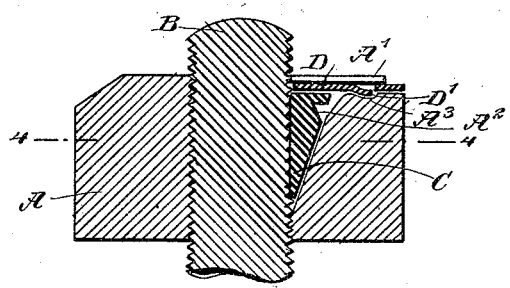
Fig. 4
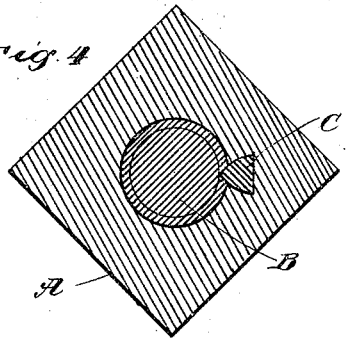
WITNESSES:
Joshua Bergstrom
INVENTORS
Horatio E. Downing.
Harry L. Dorsett.
BY
ATTORNEYS
THE NORRIS PETERS CO., PHOTO-LITHO., WASHINGTON, D. C.

UNITED STATES PATENT OFFICE.

HORATIO EDWARD DOWNING AND HARRY LEE DORSETT, OF SEWARD, OKLAHOMA TERRITORY.

NUT-LOCK.

SPECIFICATION forming part of Letters Patent No. 656,530, dated August 21, 1900.

Application filed May 17, 1900. Serial No. 17,043. (No model.)

*To all whom it may concern:*

Be it known that we, HORATIO EDWARD DOWNING and HARRY LEE DORSETT, citizens of the United States, and residents of Seward, in the county of Logan and Territory of Oklahoma, have invented a new and Improved Nut-Lock, of which the following is a full, clear, and exact description.

The object of the invention is to provide a new and improved nut-lock which is simple and durable in construction, very effective in operation, and arranged to securely hold a nut against accidental turning after the nut is screwed up to the desired place.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement. Fig. 2 is a plan view of the same with the cover removed. Fig. 3 is a sectional side elevation of the same on the line 3 3 in Fig. 1. Fig. 4 is a sectional plan view of the same on the line 4 4 in Fig. 3. Fig. 5 is an enlarged perspective view of the locking-slide, and Fig. 6 is a similar view of the cover.

The nut A, screwing on the bolt B, is formed on its top with a guideway A', extending from the side of the nut to the bore thereof, and from said guideway extends downwardly along the bore of the nut a recess $A^2$, approximately triangular in shape and arranged to receive a correspondingly-shaped tapering locking-slide C, having its inner corner sufficiently sharp to cut into the threads of the bolt B when driven home in the recess $A^2$ after the nut is screwed to the desired place on the bolt B. The outer side of the tapering slide C engages the inwardly and downwardly inclined bottom of the recess $A^2$, so that when the slide is driven home it moves inward and downward for the inner sharp corner to cut into the threads. The cover D is adapted to engage the guideway A' and extend over the slide C when the latter is in position, as is plainly shown in Fig. 3, to hold said locking-slide C against displacement in the recess $A^2$.

The cover D is formed with a downwardly-bent spring-tongue D', adapted to engage a shoulder $A^3$, formed on the nut in the bottom portion of the guideway A', so that said cover D is held against accidental displacement when once pushed into position, as illustrated in Figs. 1 and 3. If desired, the cover D can be forced out of the guideway by a suitable tool, so as to give access to the locking-slide C to remove the same by the application of a suitable tool engaging a notch C' on the outer face of the said locking-slide, as shown in Figs. 3 and 5.

When the device is to be used, the nut, without the locking-slide C and cover D, is screwed on the bolt B, and when final adjustment is had then the operator drops the locking-slide C into the recess $A^2$ and drives it home with a hammer or other tool, so as to cause the inner corner of the locking-slide to cut into the threads of the bolt, and thereby hold the nut against turning on the bolt B. When the locking-slide C is in position, as described, then the operator pushes the cover D in the guideway until the spring-tongue D' snaps in under the shoulder $A^3$ to hold the cover against displacement.

The device is very simple and durable in construction, can be cheaply manufactured, is not liable to get out of order, and securely holds the nut against turning.

Having thus fully described our invention, we claim as new and desire to secure by Letters Patent—

1. A nut-lock, having a removable locking-slide in the nut, and extending along the bore thereof to engage the threads of the bolt, and a cover removably held on the nut, to hold the locking-slide in position, as set forth.

2. A nut-lock, having a nut formed with a recess extending along the bore of the nut, the bottom of the recess being inclined inwardly and downwardly, and a tapering locking-slide having an inner sharp corner and adapted to be driven home in the recess to force the said corner inward into the threads of the bolt, substantially as shown and described.

3. A nut-lock, having a nut formed with a recess extending along the bore of the nut, the bottom of the recess being inclined inwardly and downwardly, a tapering locking-slide having an inner sharp corner and adapted to be driven home in the recess to force the said corner inward into the threads of the bolt, and a cover removably held on the nut to hold the locking-slide in position in its recesses, as set forth.

In testimony whereof we have signed our names to this specification in the presence of two subscribing witnesses.

HORATIO EDWARD DOWNING.
HARRY LEE DORSETT.

Witnesses:
LEWIS S. DOWNING,
IVY GARLAND.